United States Patent [19]

Curran

[11] 4,244,214
[45] * Jan. 13, 1981

[54] VISUAL TIRE VALVE

[76] Inventor: William F. Curran, 6561 Balfour, Allen Park, Mich. 48101

[*] Notice: The portion of the term of this patent subsequent to Mar. 18, 1997, has been disclaimed.

[21] Appl. No.: 78,668

[22] Filed: Sep. 24, 1979

Related U.S. Application Data

[63] Continuation-in-part of Ser. No. 2,915, Jan. 12, 1979, Pat. No. 4,193,295.

[51] Int. Cl.³ .............................................. B60C 23/02
[52] U.S. Cl. .................................. 73/146.8; 137/227; 116/34 R
[58] Field of Search ............... 137/227, 228, 508, 522; 73/146.8; 116/34 R

[56] References Cited

U.S. PATENT DOCUMENTS

| | | | |
|---|---|---|---|
| 3,670,688 | 6/1972 | Seaberg | 137/227 X |
| 4,072,048 | 2/1978 | Arvan | 73/146.8 |
| 4,193,295 | 3/1980 | Curran | 137/227 X |

*Primary Examiner*—Harold W. Weakley
*Attorney, Agent, or Firm*—Cullen, Sloman, Cantor, Grauer, Scott & Rutherford

[57] ABSTRACT

A visual tire valve is adapted for mounting over a tire valve stem and includes an apertured stem housing at one end mounted upon the valve stem, has an elongated bore intermediate its ends, a barrel having a counterbore, and a stem member at its other end having a normally closed longitudinal bore whose inner end communicates with the counterbore and whose outer end communicates with atmosphere. An axially apertured bolt is slidably nested within the elongated bore and has three annular bands of different colors upon its exterior for indicating over inflation, proper inflation and under inflation with respect to a window in the stem housing. A spring is interposed in compression between the bolt and stem member. A normally seated spring-biased air flow control rod is disposed within the stem member closing off air communication therethrough. A normally seated valve within the bolt is adapted to prevent passage of air therethrough in one direction. With the bolt biasing spring precalibrated for a preset tire pressure, the bolt color bands automatically indicate through the window tire air pressure as below, above or the same as the preset tire pressure.

12 Claims, 8 Drawing Figures

U.S. Patent    Jan. 13, 1981    4,244,214
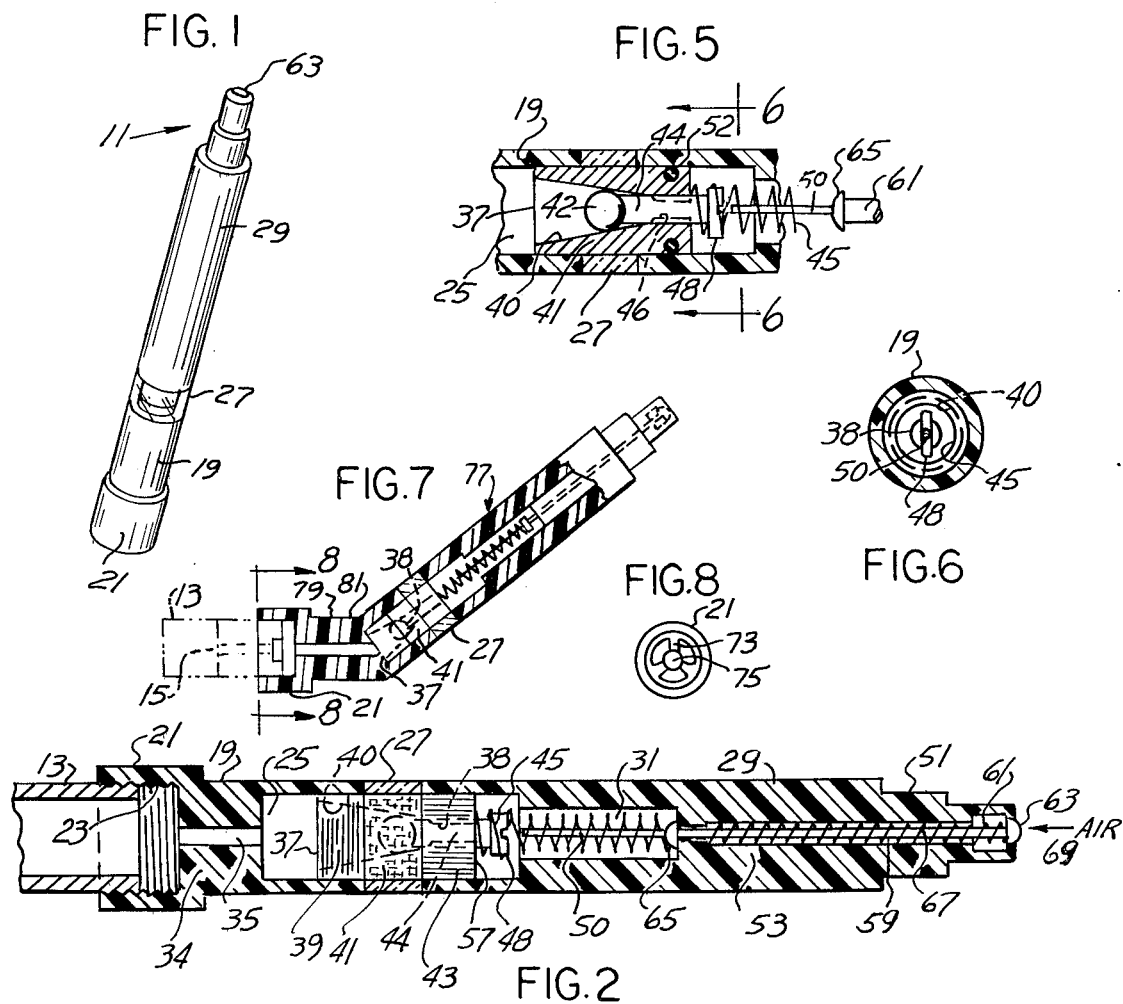
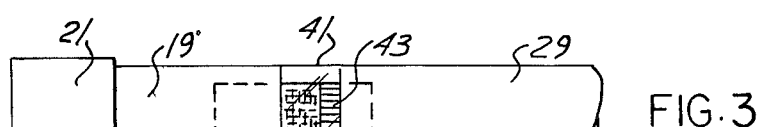
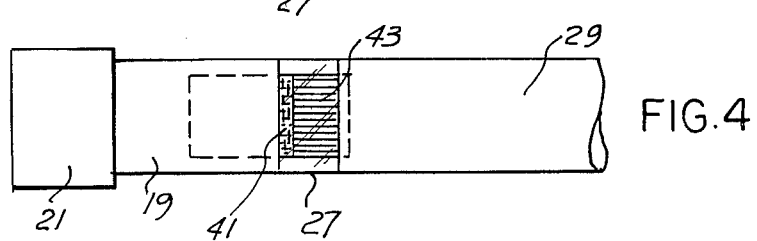

VISUAL TIRE VALVE

RELATED APPLICATION

This application is a continuation-in-part of my co-pending application Ser. No. 002,915 filed Jan. 12, 1979, now U.S. Pat. No. 4,193,295.

BACKGROUND OF THE INVENTION

Improper inflation of tires can decrease their life expentancy by as much as 50%. Some belted tires, for example, have such sensitive limitations that merely a few pounds of air pressure, plus or minus, can drastically shorten their life spans. Some tires, such as the steel belted ones, are extremely expensive, ranging in price from $60.00 to $90.00 apiece.

Under-inflated tires can usually be detected at a glance. However, modern belted tires are designed to maintain a recommended air pressure which make them appear to be somewhat flat. As a result, many motorists over-inflate them unwittingly, unaware that it has the same basic destroying effect as under-inflating.

Over-inflation is a real problem, because it's almost impossible to detect at a glance.

All tire manufacturers are emphatic when they guarantee a tire. Their guarantees are valid only if proper specified inflation recommendations are followed. In the Mercury-Monterey, for example, a permanent plaque on the inside of the glove box door recommends 26 lbs. psi in the front tires, 28 lbs. in the rear. In other words, even with four identical tires on one car, the manufacturer regards the two-pound differential from front and rear to be essential to the life and serviceability of the tires.

It is a nuisance to check tires regularly. Most people do not carry an air gauge, and, though you may occasionally get your windshield cleaned, it is almost unheard of for a service station attendant to check your tires. It's an easily overlooked task by most of us, particularly, by women.

Automobile owner's manuals and tire manufacturers have stated that improperly inflated tires can cause a loss of up to three or more miles per gallon of gasoline. This fact was considered rather insignificant when it was first realized years ago. Today, of course, the importance of stretching a gallon of gas cannot be overemphasized.

Various types of pressure gauges have, heretofore, been attempted to provide instantaneous indications of the nature of tire pressure within a tire as being normal, over-inflated or under-inflated. Examples of such efforts are shown in one or more of the following Patents:

| | |
|---|---|
| 1,473,171 | Bowden |
| 2,479,915 | Eastman |
| 1,548,470 | Kennedy |
| 1,807,752 | Poster |
| 3,889,530 | Bluem |
| 1,686,165 | Morse |
| 3,886,563 | Bluem |
| 3,208,425 | Jousma, et al |
| 3,230,968 | Struby |
| 3,260,233 | Bergunder |

SUMMARY OF THE INVENTION

It is a feature of the present invention to provide a visual tire valve which shows graphically, through the use of three colors, when the tire is over-inflated (red), under-inflated (blue), or properly-inflated (yellow). Once installed, this visual tire valve becomes an integral part of the tire.

It is a further feature to eliminate the need for an air guage after installation. The manufacturer's exact recommended pressure would be indicated when the visual tire valve shows full yellow. Any encroachment within the field of yellow by either red or blue would indicate improper inflation.

It is another feature to provide an axially apertured bolt which is movably mounted within the visual tire valve with respect to a window therein, and wherein a series of different color bands applied to said bolt will selectively show through said window, the air under pressure within the tire being, at all times, operating upon one end of said bolt with a spring yieldably bearing against its opposite end and wherein, the spring is precalibrated for a predetermined tire pressure so that when such pressure has been achieved within the tire, the yellow band will show fully through said window. Such readings will remain constantly in view. In the case of a steel-belted tire, if it appears semi-flat, but the window shows the full yellow, it is properly inflated to the manufacturer's recommendation. If the steel-belted tire has been pumped up, losing its flat look but indicates some red through said window, it is clearly over-inflated.

It is another feature to provide an improved visual tire valve which, once assembled provides an instantaneous visual indication at all times of the condition of the air pressure within said tire. The pressure of the air within the tire can be modified by adding air or removing air without disassembly of the present visual tire valve. At the same time, the addition of air or removal of air from the tire is by passage of said air directly through the present visual tire valve.

These and other features of the invention will be seen from the following specification and claims in conjunction with the appended drawing.

THE DRAWING

FIG. 1 is a full scale perspective view of the present visual tire valve.

FIG. 2 is a longitudinal section thereof, on an increased scale.

FIG. 3 is a fragmentary side view with a portion of the blue and yellow color bands showing through the window showing under inflation.

FIG. 4 is a similar view with an increased portion of the blue color band showing serious under inflation.

FIG. 5 is a fragmentary sectional view of the stem housing and bolt of FIG. 2 with its valve normally seated.

FIG. 6 is a section taken in the direction of arrows 6—6 of FIG. 5.

FIG. 7 is a longitudinal section of the visual tire valve, with portions of the stem housing set at a relative obtuse angle to facilitate reading thereof.

FIG. 8 is a section taken in the direction of arrows 8—8 of FIG. 7.

DETAILED DESCRIPTION OF A PREFERRED EMBODIMENT OF THE INVENTION

The present visual tire valve is generally indicated at 11, FIG. 1, full scale, and on an increased scale, FIG. 2 and is adapted for threading onto the conventional tire valve stem 13, fragmentarily shown.

The conventional tire valve stem 13 has therein a normally seated valve element, with an axial projecting valve member. In use, upon inflating said tire, the conventional pressurized nozzle is normally applied over the end of the tire valve stem engaging and unseating the valve member and associated valve element. As is conventional, upon application of a tire gauge to such valve stem the movable element therein operatively engages the conventional valve member sufficient to unseat the associated valve element to obtain a pressure reading on the tire gauge. With the present visual tire valve, the conventional valve element and valve member shown in FIGS. 7 and 8 may be omitted.

The present visual tire valve 11 includes an elongated stem housing 19, preferably of a plastic material, having upon one end assembly collar 21 interiorly threaded at 23 adapted for threading over the conventional valve stem 13, fragmentarily shown in FIG. 2.

Stem housing 19, inwardly of the collar 21, has a head 34 with a passage 35 therethrough, the elongated bore 25, the elongated barrel 29 having a central stem portion 53 and counterbore 31 in the barrel communicating with bore 25.

Elongated cylindrical bolt 37, FIG. 2, having an axial aperture 38 at one end of circular cross section, is adjustably nested within bore 25 and has along the length thereof and applied thereto a plurality of different color bands 39, 41 and 43 of equal width corresponding to the width of the window 27 within stem housing 19. Aperture 38 terminates in tapered bore 40 which extends to the other end of said bolt. Ball valve 42 in use is normally seated within tapered bore 40, and has a flat stem 44. Said stem extends through bore 38 with its top and bottom edges guidably positioned within slots 46 in said bolt. Stem 44 terminates in the transverse stop 48 normally spaced from said bolt which limits unseating movement of valve 42.

The laterally aligned color bands are of contrastingly different colors for easy reading. In the illustrative embodiment, one outer band 39 has been colored red to show over-inflation. The intermediate band 41 is colored yellow to show correct inflation and the outer band 43 is colored blue to show under inflation. Said visual tire valve is initially calibrated for the predetermined desired pressure within said tire and the tire has been so inflated. One or parts of a pair of said bands, FIGS. 3 and 4, will show through the window 27 for indicating pressure conditions within the tire to which the present visual tire valve has been applied.

Loosely nested within counterbore 31 and a portion of the bore 25 is the precalibrated coiled compression spring 45. Said spring at its inner end bears against the outer end of the multiple color bolt 37 or may be secured thereto if desired. Said bolt has an exterior O-ring seal 52, FIG. 5. The outer end of said barrel has a collar 51.

The elongated stem portion 53 of barrel 29 has a longitudinal bore 59 therethrough with its inner end in registry with counterbore 31. The opposite end of said stem portion extends outwardly of collar 51.

The stem housing 19 has assembled therein the bolt 37 and spring 45. Said spring engages the inner end of stem portion 53, projects into counterbore 31 and is in operative engagement with bolt 37.

So assembled, the multiple-color bolt 37 will be at the inner end of the bore 25 in engagement with head 34 and the color band 43 for the color blue will be in registry with the window 27 before the tire is pressurized. On this initial assembly, the spring 45 at its inner end will be seated as at 57 with respect to bolt 37.

The stem portion 53 has a longitudinal bore 59 therethrough, within which is normally seated spring-biased air flow control rod 61. Enlarged heads 63 and 65 are upon the opposite ends of said rod and a suitable compression spring 67 is interposed between said rod and the bore of the stem portion normally maintaining said rod in such position, as to close off the air passage 59.

Extension rod 50 at one end is adjustably threaded through head 65 and into rod 61 axially thereof, extends through spring 45 with its other end spaced from valve stem 44.

Collar 51 upon one end of barrel 29 is adapted for operative engagement with the conventional normally seated air valve within a high pressure nozzle by which compressed air may be applied to the tire through the present visual tire valve.

This is schematically shown in FIG. 2, and wherein, the arrow 69 designates the application of high pressure air through such nozzle. This causes the respective heads 63 and 65 on the flow control rod to move inwardly to an unseated position. This permits the passage of pressurized air at 69 through bore 59 and through housing 19, through the spring, through the apertured bolt 37 and through the apertured head 34 for direction through the conventional tire valve stem 13. Said pressurized air unseats ball valve 42.

In the event that the tire has been inflated to the predetermined selected correct pressure for the tire, and the conventional tire valve has been removed, the pressure upon the interior of the tire will act upon one end of the bolt 37 and ball valve 42 against the action of the spring 45.

The tapered bore 40 within the bolt is sealed closely by ball valve 42 so that essentially the primary pressure within the tire is applied to the end face of blot 37 and said ball valve.

OPERATION

Referring to FIG. 2, assuming that the tire involved is designed for use at 32 lbs. per square inch, air pressure, when the present visual tire valve is assembled over the stem 13, the tire pressure is applied to the tri-color bolt 37. With the spring 45 precalibrated for 32 pounds the compression of the spring 45 moves the bolt inwardly against the tire pressure until the yellow color band 41 is in full registry with window 27. When the tire pressure is 32 psi the spring exactly counter-balances the pressure from the tire and the yellow color band is in full registry with window 27.

Assuming, that the predetermined correct pressure for a steel belted tire involved is 24 lbs. per square inch, a spring 45 precalibrated for 24 psi is used. Once the tire has been so inflated and the visual tire valve assembled thereover, normally the yellow band 41 will be in registry with window 27.

Accordingly, should there be a loss or increase of air pressure within the tire, the bolt will have responded to such change in pressure and will move so that only part of the central yellow band will show along with part of the adjacent red color band to show over inflation, or with a portion of the blue color band 43 showing as in FIG. 3 to show under inflation. In the extreme positions of over-inflation or under-inflation, a single color band will show through the window 27 thereby designating an incorrect tire pressure either above or below the prescribed pressure for that tire.

If the tire is over-inflated, manual inward projection of the flow control rod 61 within the bore 59 unseats the heads 63 and 65 and rod 50 unseats ball valve 42 to permit escape of excess air from the tire through the visual tire valve and out through the stem portion 53 until the central color band 41 is in registry with window 27, FIG. 2. Alternately, if color designation blue shows in whole or part in the window, FIGS. 3-4, the application of high pressure air at 69, additionally causes unseating of the flow control rod 61 against its spring 67 and unseating of ball valve 42, such that air under pressure will flow directly through the visual tire valve through the spring, through the bolt and directly into the conventional valve stem of the tire until, again, the central color band 41 marked yellow for illustration is in full registry with window 27.

The present visual tire valve mounted upon the tire valve stem 13 is capable of functioning whether or not the conventional normally seated valve element 15 is in said valve stem or not. Assuming as in FIG. 7 that the conventional valve element is retained within the tire valve stem 13, then there is incorporated with the assembly collar 21 internally thereof the transverse apertured spider 73 having a central boss 75 adapted for registry with the valve element unseating said tire valve element as the visual tire valve is assembled.

In the preferred embodiment the bolt 37 is three fifths the length of the bore 25, and the color bands 39, 41 and 43 are of equal width. Window 27 is central of said bore so that with the usual tire valve precalibrated to a preselected tire pressure, the central color band 41 registers with said window. Maximum movement of said bolt in either direction does not exceed the width of a color band.

A slight modification of the present visual tire valve is designated at 77 in FIG. 7. Here the only change is that a portion of the stem housing 79 extends at an obtuse angle 81 from the assembly collar 21 to facilitate reading of the visual tire valve. Thus, the reading portion of the visual tire valve, instead of being radially extending as it would normally be if attached to the tire valve stem, will extend outwardly sufficiently to facilitate reading and at the same time, will fore-shorten its protrusion safely below the critical level where it can be protected by the wheel rim against curb damage.

Having described my invention, reference should now be had to the following claims.

I claim:

1. A visual tire valve adapted for mounting over a tire stem comprising a stem housing at one end mounted upon said stem, said housing having an elongated bore intermediate its ends and a barrel at its other end having a counterbore communicating with said bore;
    a bolt slidably mounted within said bore having a longitudinal aperture therethrough;
    a oneway valve normally seated in said aperture having a stem projected loosely through said bolt aperture and outwardly thereof;
    there being three annular bands of different colors end-to-end over the exterior of said bolt, for indicating over-inflation, proper inflation, and under-inflation, respectively;
    a transparent window in said stem housing of the same width as one color band, for viewing one band and alternately, parts of a pair of adjacent bands;
    said barrel including an axial stem portion having a normally closed longitudinal bore, the inner end of the stem portion being in registry with said counterbore and its outer end extending from said barrel;
    a spring calibrated for a predetermined tire pressure, within said barrel interposed in compression between said bolt and stem portion;
    and a normally seated spring-biased air flow control rod within said stem portion closing off air communication therethrough, and upon application thereto of air under pressure adapted to unseat for transmitting compressed air through said stem portion and housing, unseating said valve, and through said tire valve stem, said bolt reacting to the tire pressure until an intermediate color band registers with said window.

2. In the tire valve of claim 1, said stem housing having an internally threaded collar at one end mounted upon said tire valve stem, said stem housing including an apertured head between said collar and bore, said bolt being cylindrical and movably sealed within said elongated bore.

3. In the visual tire valve of claim 1, said valve stem terminating in a stop outwardly of said bolt;
    an extension rod at one end adjustably threaded into said air flow control rod axially thereof with its other end normally spaced from said valve stop;
    said flow control rod on over inflation adapted for manual unseating, said extension rod unseating said valve to permit the escape of excess pressurized air from the tire and through said housing and control rod until the intermediate color band registers with said window.

4. In the visual tire valve of claim 1, said visual tire valve being precalibrated for the predetermined proper tire inflation with the intermediate color band registering with said window, any subsequent movement of said bolt and corresponding color bands due to a change in said inflation pressure providing a visual indication at said window of over and under inflation, respectively.

5. In the visual tire valve of claim 1, said stem housing and barrel being of uniform outside diameter.

6. In the visual tire valve of claim 1, the outer end of said stem portion adapted for unseating engagement with a normally seated air pressure valve of a source of air under pressure, said air flow control rod unseating for the passage of compressed air through said stem portion, housing and bolt into said tire.

7. In the visual tire valve of claim 1, said flow control rod having normally seated enlarged valve heads at its opposite ends, inward unseating movement of said rod permitting the passage of air through said stem portion and barrel.

8. In the visual tire valve of claim 1, said color bands being of uniform width, corresponding to the width of said window, said bands being red, yellow and blue to respectively indicate through said window over inflation, proper inflation and under inflation.

9. In the visual tire valve of claim 1, said bolt being three-fifths of the length of said stem housing bore, said window being central of said bore so that with the visual tire valve precalibrated to a pre-selected tire pressure, the central color band registers with said window, with maximum movement of said bolt in either direction not exceeding the width of any color band.

10. In the visual tire valve of claim 1, the bolt aperture being axial and at one end terminating in a tapered bore;

said oneway valve being a ball and seated within said tapered bore.

11. In the visual tire valve of claim 1, a normally seated tire valve within said valve stem;

and an apertured web within said one end of the stem housing adapted on assembly of the stem housing over the tire valve stem to unseat said tire valve, for applying the air pressure of said tire to one end of said bolt.

12. In the visual tire valve of claim 1, said stem housing having an obtuse angular bend intermediate its ends for prelocating the projecting end of said barrel to facilitate reading.

* * * * *